United States Patent

Houck et al.

[11] Patent Number: 5,943,411
[45] Date of Patent: Aug. 24, 1999

[54] METHOD FOR ROUTING AN NP CALL

[75] Inventors: David J. Houck, Colts Neck; Lev Slutsman, Wayside; Kamlesh T. Tewani, Freehold; Lance Wayne Wilson, Marlboro, all of N.J.

[73] Assignee: AT&T Corp., Middletown, N.J.

[21] Appl. No.: 08/855,828

[22] Filed: May 12, 1997

[51] Int. Cl.⁶ .............................. H04M 3/42; H04M 7/00
[52] U.S. Cl. .......................... 379/219; 379/201; 379/207; 379/229
[58] Field of Search .................................. 379/242, 201, 379/207, 219, 220, 221, 229, 230

[56] References Cited

U.S. PATENT DOCUMENTS

| | | | |
|---|---|---|---|
| 5,333,184 | 7/1994 | Doherty et al. | 379/229 |
| 5,473,681 | 12/1995 | Partridge, III | 379/221 |
| 5,515,427 | 5/1996 | Carlsen et al. | 379/207 |
| 5,696,816 | 12/1997 | Sonnenberg | 379/220 |
| 5,699,416 | 12/1997 | Atkins | 379/207 |
| 5,703,939 | 12/1997 | Bushnell | 379/207 |
| 5,748,724 | 5/1998 | Sonnenberg | 379/220 |
| 5,796,813 | 8/1998 | Sonnenberg | 379/200 |

*Primary Examiner*—Harry S. Hong
*Assistant Examiner*—Benny Q. Tiell

[57] ABSTRACT

A method of routing an interim NP call in which it is determined to give a called number interim NP redirection rather than conventional RCF redirection when the called number is to be ported. When a ported call is to receive interim NP redirection and SS7 networking is used, an Initial Address Message for the call is created with the Called Party Number parameter of the Initial Address Message populated with the Location Routing Number for the switch to which the called number has been ported. The Generic Address Parameter of the Initial Address Message is populated with the called number and the M bit of the Forward Call Indicator parameter of the Initial Address Message is set. The call is then redirected to the switch to which the called number has been ported based on the Location Routing Number in the Called Party Number parameter of an Initial Address Message. This method avoids the use of RCF "shadow numbers" and the need to query an external long-term NP database.

3 Claims, 4 Drawing Sheets

METHOD FOR ROUTING AN NP CALL

BACKGROUND OF THE INVENTION

1. Field of the Invention

The present invention relates to the field of telecommunications. More particularly, the present invention relates to interim telecommunications number portability.

2. Description of the Related Art 2.1 Terminology

Number Portability (NP) provides a subscriber with the ability to move from one End Office (EO) to another EO while keeping the subscriber's original Directory Number (DN). There are three types of Number Portability: Service Provider Portability, Geographic Portability, and Service Portability. Service Provider Portability enables a subscriber to change Local Service Providers while maintaining the same Directory Number and while ensuring no performance degradation between service providers or carriers. A Local Service Provider (LSP) is a provider of local access functionality to an end customer. LSPs are synonymous with Local Exchange Carriers (LECs), Alternate Local Exchange Carriers, Competitive Access Providers, and other terms that may be used to refer to providers of local access. Geographic Portability enables a subscriber to physically move within some reasonably defined region, for example, moving within the same Local Access and Transport Area (LATA), and to keep the same directory number. In such a situation, the subscriber may or may not change service providers. Service Portability enables changing service type, for example, POTS to ISDN, while maintaining the same directory number.

Presently, a call is routed based on the NPA-NXX number of the called party number. An NPA (Numbering Plan Area) number is the initial group of 3 digits of a North American Numbering Plan (NANP) number. The format of an NPA number is NXX, where N is any digit from 2 to 9 and X is any digit from 0 to 9. Currently, the NPA-NXX number identifies the EO serving a called party. All line numbers under a particular NPA-NXX are served from the same end office and are generally in the same local area. The LSP appearing in the Local Exchange Routing Guide (LERG) identifies the default LSP and EO associated with a particular NPA-NXX. The default routing for a call to a dialed number is to the default LSP for the dialed number. A Ported Number is an end-customer's number that is no longer served by the default LSP defined in the Local Exchange Routing Guide (LERG). An NPA-NXX is defined as being portable if it has one or more ported numbers. That is, an NPA-NXX is considered to be portable when any subscriber previously served from an EO associated with the NPA-NXX moves to another LSP and keeps the same 10-digit NPA-NXX-XXXX.

2.2 Long-Term Number Portability

For the long-term, the Location Routing Number (LRN) approach, which uses AIN (Advanced Intelligent Network) concepts, is being developed for addressing the service provider portability and the restricted geographic portability forms of NP. A Location Routing Number is an identifier for an LSP EO. The LRN of an LSP EO is defined as a 10-digit number having the format NPA-NXX-XXXX, such that the fist six digits is an NPA-NXX assigned to an LSP EO. A 6-digit translation on the NPA-NXX of the LRN results in routing calls to the LSP EO.

An NP Service Control Point (SCP) database is a Number Portability database storing number portability data, such as the LRNs for the EOs serving the ported numbers. In the long-tem, for interswitch calls, switches will query an NP database with a destination member (DN) for obtaining NP and routing information for that number. A destination number can be the dialed number, or the number derived after service processing, such as, the translated number after "800" service process has been applied In the case of ported DNs, queries to an NP SCP database return the LRN of the recipient switch to which a number has been ported. In the case of non-ported DNs, the queries cause the NP database to return the actual DN and not an LRN. Thus, a call to a non-ported DN is routed based on the dialed number while a call to a ported DN is routed based on the LRN.

The proper routing takes place because when a querying switch receives an LRN, the LRN is used to populate the Called Party Number (CdPN) parameter of the SS7 (Signaling System 7) ISUP (ISDN User Part) IAM (Initial Address Message). The CdPN parameter is an existing SS7 ISUP IAM parameter presently carrying the destination or directory number. Switches translate the number contained in the CdPN parameter for determining bow to route a call. In the long-term LRN approach, the dialed number originally used in the query of the database is "preserved" by string it in the Generic Address Parameter (GAP) of the IAM. The GAP is an existing optional SS7 ISUP IAM parameter. Multiple GAPs can be defined for a call. Additionally, the M bit of the Forward Call Indicator (FCI) parameter of the IAM is used for indicating whether an NP query has been performed so that more than one NP query is prevented from being launched during the setup of an interswitch call to a portable NPA-NXX.

FIG. 1 shows a call flow mechanism for the long-term LRN approach for an illustrative intraLATA call. In FIG. 1, Station A is served by a Local Service Provider 1 (LSP1). At 11, Station A dials the number of Station B. Station B has a number that has been ported from LSP2 to LSP3, as indicated by the broken dashed line between LSP2 and Station B. At 12, the originating switch launches a query to an NP database based on the dialed number being an interswitch intraLATA call and having a portable NPA-NXX. Since the dialed number has been ported, the NP database returns an LRN for the dialed number at 13. The returned LRN is used to populate the Called Party Number (CdPN) parameter of the IAM. The dialed number is used to populate the Generic Address Parameter (GAP) of the IAM. To avoid further NP database queries, the M bit of the FCI NP Query Indicator is set to "1". At 14, the signaling switch routes the call to a tandem switch based on the first six digits of the LRN. The tandem switch routes the call to LSP3 based on the first six digits of the LRN at 15. The LSP3 EO serving the ported subscriber recognizes its own LRN in the CdPN, obtains the dialed number from the GAP of the IAM, and completes the call to station B at 16.

2.3 Near-Term Number Portability

A common near-term, interim NP scheme is called Remote Call Forwarding (RCF). Remote Call Forwarding is a standard Local Exchange Carrier service that allows every call to a DN at an EO to be redirected to another DN in the same or a different EO. The RCF approach is only an interim NP scheme because it inefficiently routes every call through the subscriber's original serving EO, and because there are some adverse feature interactions between RCF and end-user Custom Calling Services, such as Caller ID and Automatic Call Return. Also, the conventional RCF approach requires use of two DNs per subscriber, that is, a "real" directory number that can be found in a telephone book, and a "shadow" directory number used for both rerouting the call to the switch serving the ported customer and completing the call to the proper customer. The base EO, as determined by the dialed DN, processes the real DN, determines that the call should receive RCF redirection, and reroutes the call based on the shadow DN. The terminating EO, now serving the ported customer and having an NPA-NXX matching the NPA-NXX of the shadow number, completes the call to the customer's station via normal switch translation.

FIG. 2 shows a call flow mechanism for the RCF approach for an illustrative intraLATA call. Station C, with a DN of 908-484-4811 and being originally served by LSP1, is ported to LSP2, as indicated by the dashed line. LSP2 assigns to station C a line shadow number of, for example, 908-949-1111. As part of the porting process, the RCF feature for Station C's DN is activated on the LSP1 EO2 originally serving station C. The LSP2 EO treats the shadow number associated with Station C like any other assigned line number. Station A, served by LSP1, dials the DN for Station C at 21. At 22, LSP1 EO1 routes the call based on the NPA-NXX for LSP1 EO2, which originally served Station C. At 23, LSP1 EO2 redirects the call to the Terminating EO based on the shadow DN, that is, to LSP2 EO3.

The conventional RCF approach suffers from the problem of the so-called trombone effect. To illustrate this, consider the situation shown in FIG. 2 when a Station B on EO3 dials the number of Station C at 24. Based on the first 6 digits of the DN, the serving EO, that is, EO3, has no indication that Station C has been ported and uses standard routing. Consequently, the call is routed to LSP1 EO2, which originally served Station C, based on the DN's NPA-NXX at 25. EO2 redirects the call based on its shadow number back to the LSP2 EO3, which now serves Station C. The call is routed correctly, but inefficiently in the trombone effect. The trombone effect takes place when the called number is ported from a first LSP to a second LSP, and the calling number originates on a switch that also serves the ported customer. The call then tandems through the ported customer's former switch (associated with the first LSP) before being routed back to the second LSP.

To avoid the trombone effect, a switch must be able to recognize that a call to a ported number is actually an intraswitch call, not an interswitch call. One way for a switch to recognize that a call is an intraswitch call is for the switch to do a 10-digit translation.

What is needed is a way to handle interim NP calls without using duplicative shadow numbers while also avoiding the trombone effect.

SUMMARY OF THE INVENTION

The present invention provides a way to handle interim NP calls without using the long-term NP database, without using duplicative shadow numbers, and also avoiding the trombone effect. Additionally, the present invention supports interim NP calls that are completed at EOs that only support MF signaling. The present invention improves the conventional RCF scheme for interim NP, (i.e., when not all the infrastructure required for implementing the long-term LRN approach is in place). The present invention builds on the RCF approach for completing the calls to a ported subscriber, but eliminates the use of shadow numbers required by the RCF approach. Once it is determined from information that is local to a switch that a subscriber has been ported (i.e., without querying an NP database), the present invention uses LRN-type concepts instead of a shadow number for completing a call.

To properly route a call using SS7 signaling, the present invention requires that the IAM created at the redirecting switch be populated with the LRN of the switch to which the called subscriber has been ported. That is, when a call to a ported number is to receive interim NP redirection rather than RCF redirection, then an Initial Address Message for the call is created with the Called Party Number parameter of the Initial Address Message populated with the Location Routing Number for the switch to which the called number has been ported rather than with the shadow number. Also, just as in the long-term approach, the Generic Address Parameter of the Initial Address Message is populated with the called number and the M bit of the Forward Call Indicator parameter of the Initial Address Message is set. The call is then redirected to the switch to which the called number has been ported based on the Location Routing Number in the Called Party Number parameter of an Initial Address Message.

BRIEF DESCRIPTION OF THE DRAWINGS

The present invention is illustrated by way of example and not limitation in the accompanying figures in which like reference numerals indicate similar elements and in which.

DETAILED DESCRIPTION

The present invention eliminates the use of duplicative, per subscriber, "shadow numbers" required for supporting the Remote Call Forwarding approach for interim NP. The terminology used in describing the present invention is based on the concepts defined in the Signaling System 7 (SS7) Network standardized in ITU-T. The present invention requires only that a donor switch, that is, a switch that is RCF capable and from which a subscriber has ported, be able to distinguish between incoming calls that are to receive conventional RCF redirection and incoming calls that are to receive interim NP redirection in accordance with the present invention. In other words, when the donor switch receives a call for a subscriber that has been ported, the switch treats the call as a redirection in accordance with the present invention by, for example, creating an outgoing IAM message and routing the call to the ported subscriber using LRN techniques.

Figure 1:
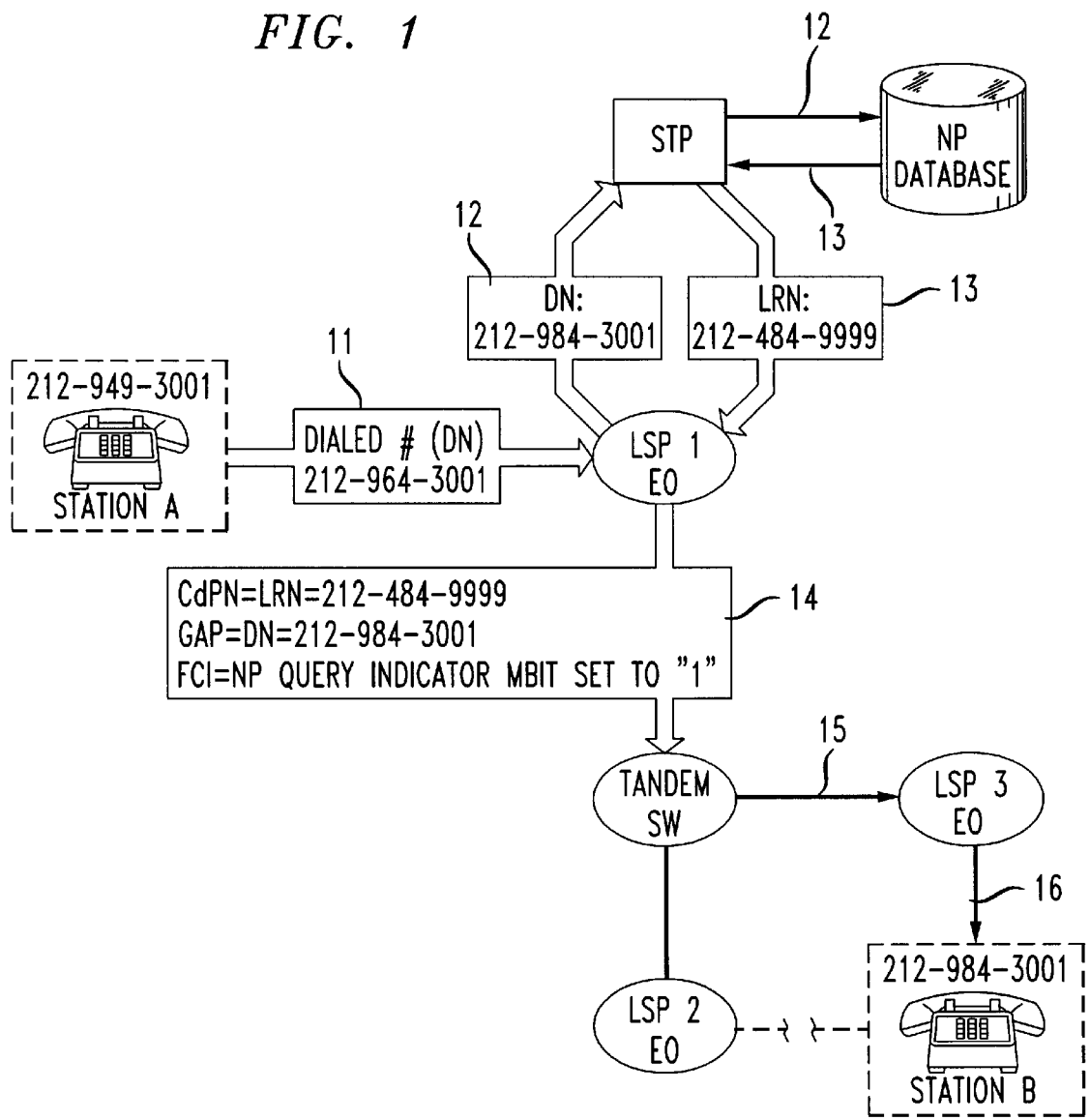
FIG. 1 shows a call flow mechanism for a conventional Location Routing Number (LRN) approach for an illustrative intraLATA call.
Figure 2:
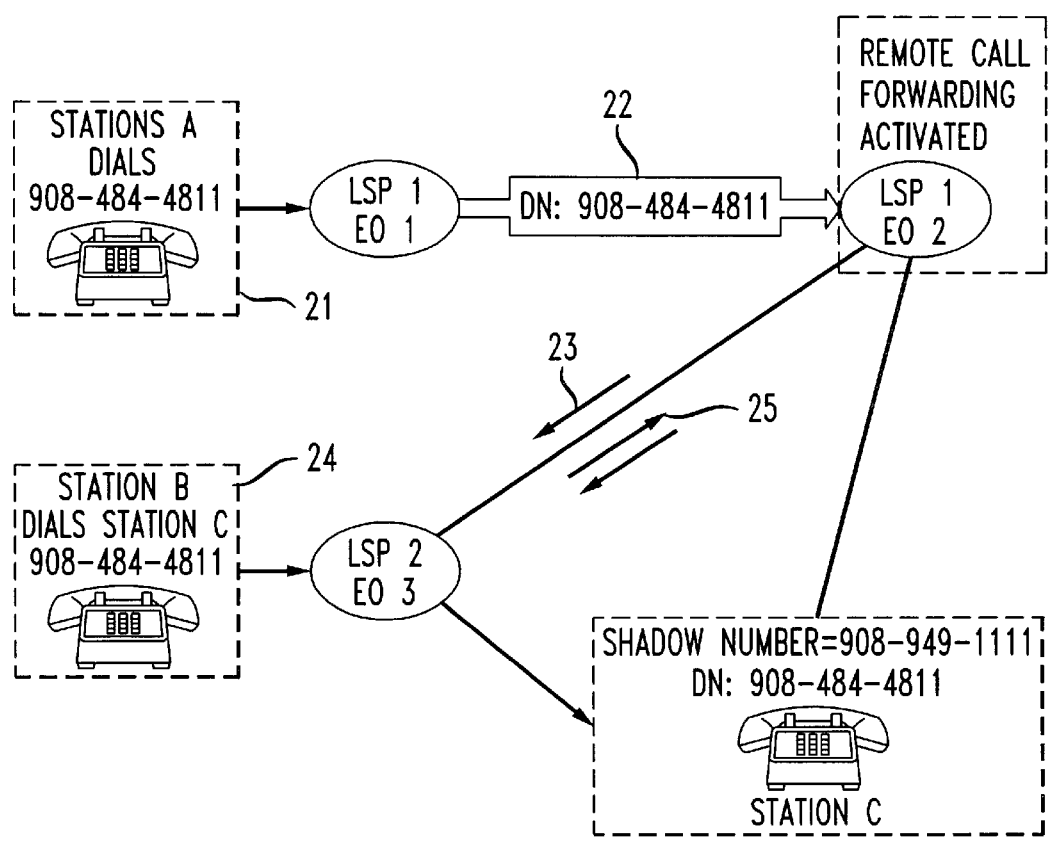
FIG. 2 shows a call flow mechanism for a conventional Remote Call Forwarding (RCF) approach for an illustrative IntraLATA call.
Figure 3:
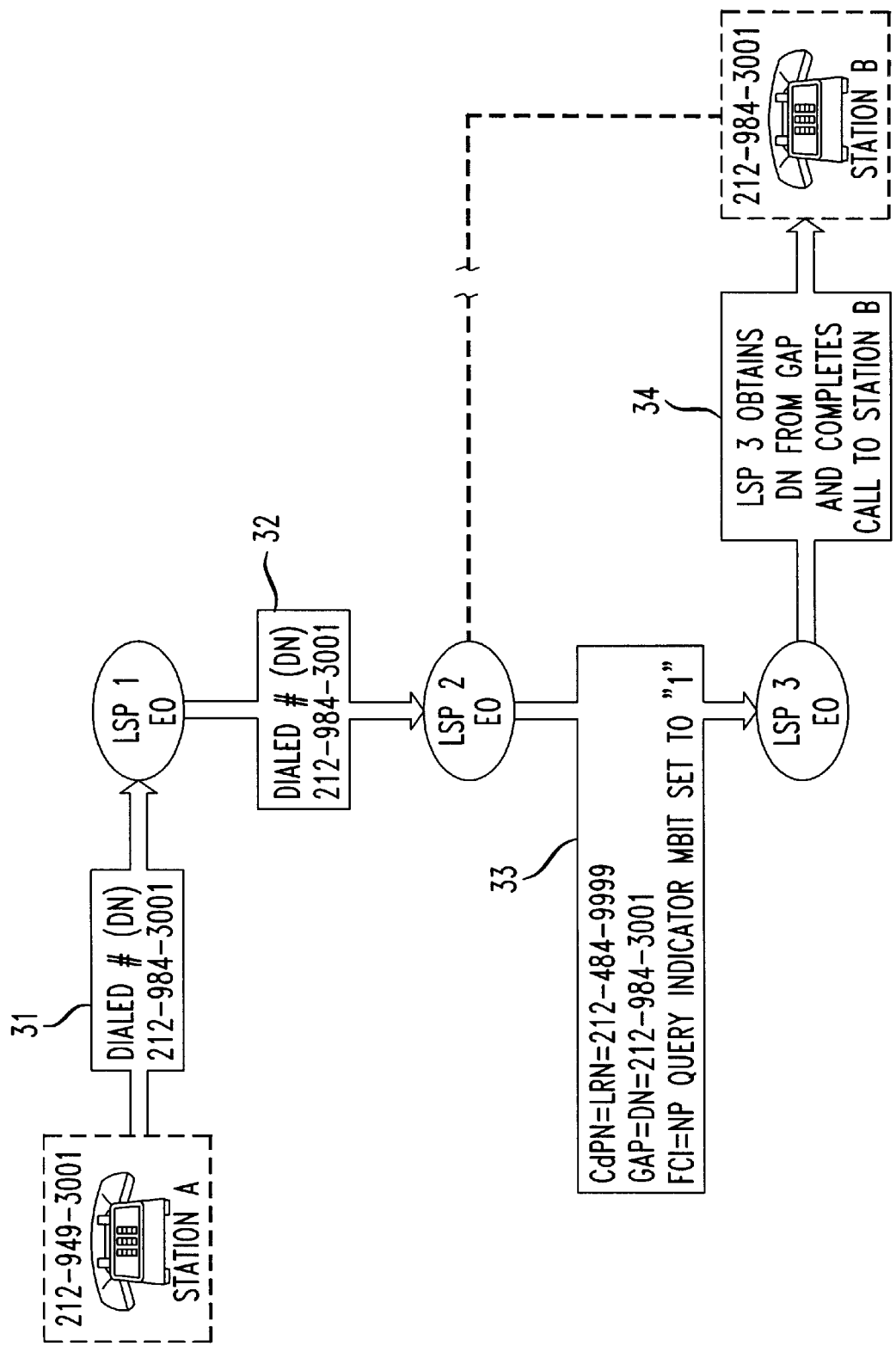
FIG. 3 shows a call flow mechanism for the present invention for an illustrative intraLATA call.

The present invention uses an LRN number instead of a "shadow" number when redirecting interim NP calls and uses both the LRN number and the DN in the IAM. FIG. 3 illustrates the call flow of the present invention when the terminating switch serving the ported customer is connected via SS7 networking and when the terminating switch is LRN-ready, i.e., capable of processing an IAM message with an LRN in the Called Party Number (CdPN) parameter, a DN in the Generic Address Parameter (GAP), and an FCI with M bit set to "1". In FIG. 3, Station A is served by an LSP1. At 31, Station A dials the number of Station B, which has a number that has been ported from LSP2 to LSP3 as shown by the broken dashed line between the LSP2 EO and Station B. LSP3 supports SS7 signaling and, as noted above, is LRN ready. At 32, LSP1 forwards the call to LSP2. In accordance with the present invention, LSP2 determines that the called subscriber needs interim NP redirection based on attempting to terminate the call to the ported number. Instead of invoking conventional RCF procedures, and without making an NP query, LSP2 EO performs interim NP redirection by populating the outgoing IAM message for the call in a manner corresponding to the LRN approach rather than the RCF approach. The LRN for the EO now serving the ported number is placed into the IAM Called Party Number (CdPN) parameter, the DN is placed into the GAP, and the FCI M bit Indicator is set to "1" indicating that the "query" has been done. At 33, the call is then routed to LSP3. At 34, the LSP3 EO serving the ported subscriber recognizes its own LRN in the CdPN, obtains the dialed number from the GAP, and completes the call to station B.

Figure 4:
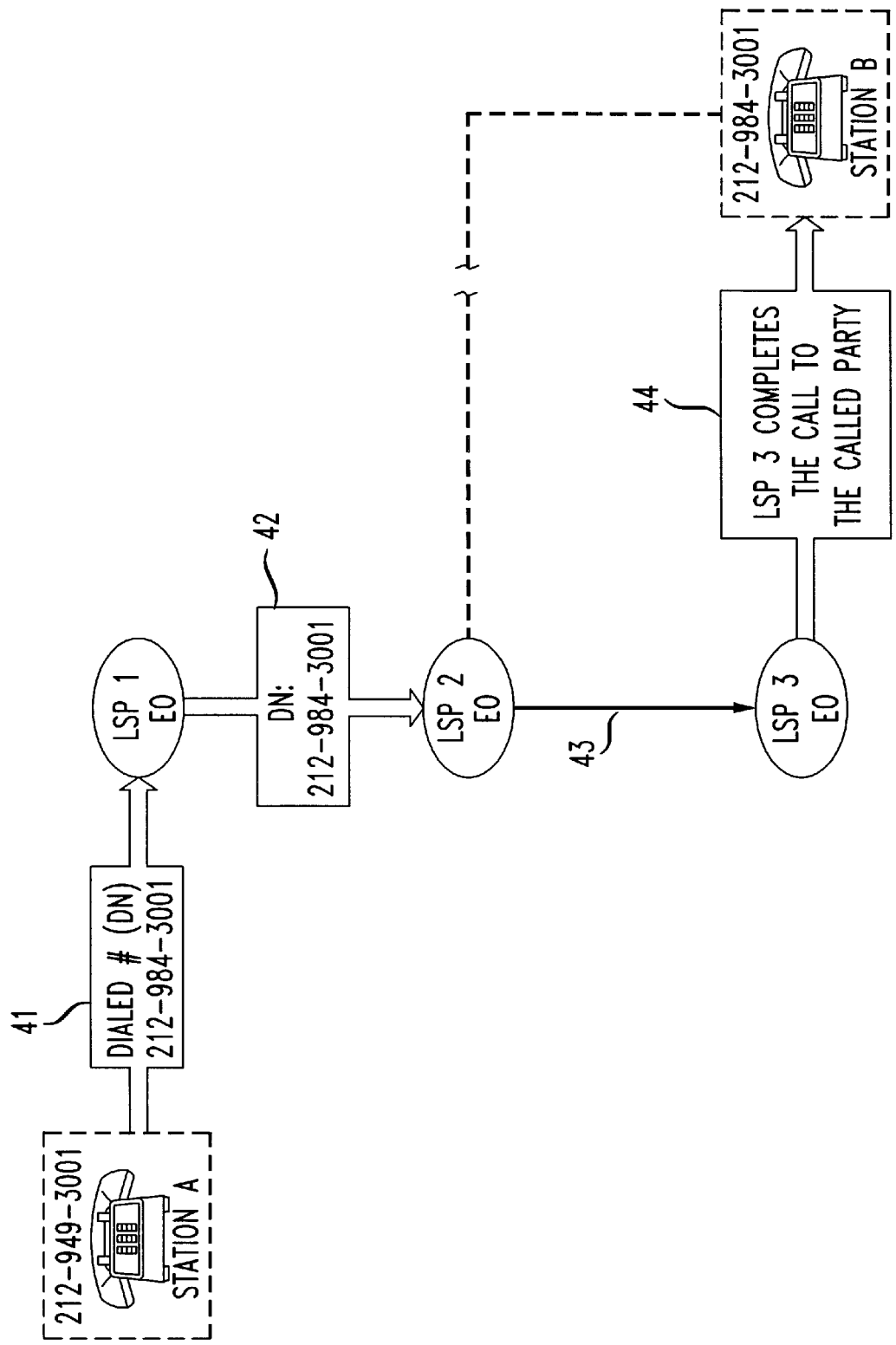
FIG. 4 shows a call flow mechanism for the present invention for an intraLATA call when the signaling and terminating switches are interconnected via MF signaling.

FIG. 4 shows a call flow mechanism for the present invention for an intraLATA call when the originating and terminating switches are interconnected via MF signaling, that is, SS7 signaling is not available at the terminating EO. In FIG. 4, Station A is served by a LSP1. At 41, Station A dials the number of Station B. Station B has a number that has been ported from LSP2 to LSP3. At 42, LSP1 forwards the call to LSP2. In accordance with the invention, LSP2 determines that the called subscriber needs interim NP redirection based on attempting to terminate the call to the ported number. LSP2 EO uses the LRN to select an outgoing MF trunk to the LSP3 EO. At 43, LSP2 EO uses MF signaling to pass the (ported) dialed number. The LSP3 EO recognizes that the call is to one of its subscriber lines by searching for the dialed DN in its internal database of all 10 digit DNs ported to it. After finding a match, the switch completes the call to station B at 44.

The present invention avoids the trombone effect experienced by conventional RCF approaches. For example, consider the situation in which a subscriber on LSP3 EO dials the number of Station B in FIG. 4. LSP3 EO first searches for the dialed DN in an internal database of all 10 digit DNs ported to it. After finding a match, the LSP3 EO completes the intraswitch call to Station B, without tandeming through a switch in LSP2.

While the present invention has been described in connection with the illustrated embodiments, it will be appreciated and understood that modifications may be made without departing from the true spirit and scope of the invention.

What is claimed is:

1. A method of routing an interim Number Portability call using SS7 signaling techniques, comprising the steps of:

determining whether a called number of an incoming call is to receive Remote Call Forwarding redirection or interim Number Portability redirection;

creating an Initial Address Message for SS7 signaling for the call when the called number is determined to receive interim NP redirection;

populating a Called Party Number parameter of the Initial Address Message with a Location Routing Number for a switch to which the called number has been ported when, without a query to an Number Portability database, the called number is determined to receive interim Number Portability redirection;

populating a Generic Address Parameter of the Initial Address Message with the called number when the called number is determined to receive interim Number Portability redirection;

setting an M bit of the Forward Call Indicator parameter of the Initial Address Message when the called number is determined to receive interim Number Portability redirection; and redirecting the incoming call to the switch to which the called number has been ported based on the Location Routing Number in the Called Party Number parameter of an Initial Address Message.

2. A method of routing an interim Number Portability call using MF signaling techniques, comprising the steps of:

determining whether a called number of an incoming call is to receive Remote Call Forwarding redirection or interim Number Portability redirection;

selecting an outgoing trunk based on an Location Routing Number for a switch to which the called number has been ported when, without a query to an Number Portability database, the called number is determined to receive interim Number Portability redirection;

redirecting the incoming call to the switch to which the called number has been ported using MF signaling for passing the called number to the switch to which the called number has been ported; and determining at the switch to which the called number has been ported that the incoming call is to a subscriber line of the switch to which the called number has been ported.

3. The method according to claim 2, wherein the step of determining that the incoming call is to a subscriber line of the switch to which the called number has been ported includes the step of searching a database that is internal to the switch containing all 10 digit numbers that have been ported to the switch.

* * * * *